US007545849B1

(12) United States Patent
Gunter (10) Patent No.: US 7,545,849 B1
(45) Date of Patent: Jun. 9, 2009

(54) SIGNAL SPECTRUM SPREADING AND COMBINING SYSTEM AND METHOD

(75) Inventor: Michial Allen Gunter, Fremont, CA (US)

(73) Assignee: Google Inc., Mountain View, CA (US)

( * ) Notice: Subject to any disclaimer, the term of this patent is extended or adjusted under 35 U.S.C. 154(b) by 976 days.

(21) Appl. No.: 10/402,878

(22) Filed: Mar. 28, 2003

(51) Int. Cl.
*H04B 1/00* (2006.01)
*H04L 27/06* (2006.01)

(52) U.S. Cl. .................. 375/146; 375/147; 375/316; 375/343; 375/295

(58) Field of Classification Search ......... 375/130–153, 375/343, 316, 295
See application file for complete search history.

(56) References Cited

U.S. PATENT DOCUMENTS

| | | | |
|---|---|---|---|
| 4,358,844 A | 11/1982 | Pirani | |
| 5,410,568 A * | 4/1995 | Schilling | 370/342 |
| 5,623,485 A | 4/1997 | Bi | |
| 5,646,964 A | 7/1997 | Ushirokawa et al. | |
| 5,649,299 A | 7/1997 | Battin et al. | |
| 5,677,929 A | 10/1997 | Asano et al. | |
| 5,691,974 A | 11/1997 | Zehavi et al. | |
| 5,715,236 A | 2/1998 | Gilhousen et al. | |
| 5,742,694 A | 4/1998 | Eatwell et al. | |
| 5,809,061 A | 9/1998 | Shea et al. | |
| 5,822,360 A | 10/1998 | Lee et al. | |
| 5,825,807 A | 10/1998 | Kumar | |
| 5,864,548 A | 1/1999 | Liu | |
| 5,940,429 A | 8/1999 | Lam et al. | |
| 5,940,791 A | 8/1999 | Byrnes et al. | |

(Continued)

FOREIGN PATENT DOCUMENTS

EP  1047215  10/2000

(Continued)

OTHER PUBLICATIONS

Bernardini A. et al. Linear Prediction Methods for Interference Elimination in Spread Spectrum Systems, European Transaction on Telecommunications and Related Technologies, AEI, Milano, IT, vol. 1, No. 1, 1990, pp. 67-78, XP000170707, ISSN; 112-3862.

(Continued)

*Primary Examiner*—Chieh M Fan
*Assistant Examiner*—Jason M. Perilla
(74) *Attorney, Agent, or Firm*—Fish & Richardson P.C.

(57) ABSTRACT

The present invention facilitates efficient and effective combination of multiple spread spectrum signals into a single stream. A spread spectrum signal combination system and method of the present invention facilitates fast communication of information and increases overall network communication performance by coordinating conversion from spread spectrum protocols to single stream communication protocols. A plurality of signals can be combined into a single stream of information by selecting among them on a chip time basis in a predetermined pattern (a pseudo-random pattern). The predetermined pattern can be balanced and have the same number of ones and zeroes (e.g., a balanced pattern stored in a precomputed table with randomly arranged rows). For example, the predetermined pattern can be implemented with a shuffled Hadamard function. Alternatively, the selection part of a Hadamard table can be replaced with a pseudo-random number generator such that the rest of the table remains as a shuffled Hadamard.

24 Claims, 7 Drawing Sheets

U.S. PATENT DOCUMENTS

| | | | |
|---|---|---|---|
| 6,005,891 A | 12/1999 | Chadwick et al. | |
| 6,009,118 A | 12/1999 | Tiemann et al. | |
| 6,009,129 A | 12/1999 | Kenney et al. | |
| 6,072,822 A | 6/2000 | Naruse et al. | |
| 6,091,760 A | 7/2000 | Giallorenzi et al. | |
| 6,128,332 A | 10/2000 | Fukawa et al. | |
| 6,169,912 B1 | 1/2001 | Zuckerman | |
| 6,185,246 B1 | 2/2001 | Gilhousen | |
| 6,211,828 B1 | 4/2001 | Krylov et al. | |
| 6,249,760 B1 | 6/2001 | Bossemeyer et al. | |
| 6,256,609 B1 | 7/2001 | Byrnes et al. | |
| 6,359,875 B1 * | 3/2002 | Hamada et al. | 370/342 |
| 6,393,047 B1 * | 5/2002 | Popovic' | 375/140 |
| 6,411,645 B1 | 6/2002 | Lee et al. | |
| 6,426,977 B1 | 7/2002 | Lee et al. | |
| 6,449,305 B1 | 9/2002 | Menich et al. | |
| 6,463,089 B1 | 10/2002 | Chauncey et al. | |
| 6,496,474 B1 | 12/2002 | Nagatani et al. | |
| 6,507,573 B1 | 1/2003 | Brandt et al. | |
| 6,535,544 B1 | 3/2003 | Partyka | |
| 6,611,600 B1 | 8/2003 | Leber et al. | |
| 6,640,209 B1 | 10/2003 | Das | |
| 6,665,825 B1 | 12/2003 | Mobin et al. | |
| 6,675,125 B2 * | 1/2004 | Bizjak | 702/179 |
| 6,754,282 B1 * | 6/2004 | Ross et al. | 375/265 |
| 6,807,161 B2 * | 10/2004 | Bender et al. | 370/332 |
| 6,829,289 B1 | 12/2004 | Gossett et al. | |
| 6,982,945 B1 | 1/2006 | Gossett | |
| 7,016,398 B2 * | 3/2006 | Bradley | 375/147 |
| 7,103,026 B2 * | 9/2006 | Hall et al. | 370/335 |
| 7,106,782 B2 * | 9/2006 | Howard et al. | 375/146 |
| 7,142,536 B1 | 11/2006 | Gossett et al. | |
| 7,174,356 B2 * | 2/2007 | Agami et al. | 708/622 |
| 2002/0015388 A1 * | 2/2002 | Kim et al. | 370/252 |
| 2002/0106004 A1 | 8/2002 | Tan | |
| 2002/0118728 A1 * | 8/2002 | Mohseni et al. | 375/146 |
| 2002/0172180 A1 | 11/2002 | Hall et al. | |
| 2002/0191566 A1 * | 12/2002 | Fogel | 370/335 |
| 2003/0009325 A1 | 1/2003 | Kirchherr et al. | |
| 2003/0123525 A1 * | 7/2003 | Smee et al. | 375/147 |
| 2003/0138031 A1 * | 7/2003 | Okubo et al. | 375/144 |
| 2003/0161339 A1 * | 8/2003 | Oishi et al. | 370/441 |
| 2003/0185286 A1 | 10/2003 | Yuen et al. | |
| 2004/0095990 A1 | 5/2004 | Gossett et al. | |
| 2004/0228389 A1 * | 11/2004 | Odenwalder | 375/146 |
| 2004/0267860 A1 * | 12/2004 | Agami et al. | 708/622 |
| 2005/0047482 A1 | 3/2005 | Gossett et al. | |
| 2006/0062284 A1 | 3/2006 | Li et al. | |
| 2006/0146876 A1 * | 7/2006 | Kim et al. | 370/468 |
| 2006/0251261 A1 | 11/2006 | Christoph | |
| 2007/0019644 A1 * | 1/2007 | Lee | 370/389 |
| 2007/0070952 A1 * | 3/2007 | Yoon et al. | 370/334 |
| 2007/0147439 A1 * | 6/2007 | Rhee et al. | 370/537 |
| 2007/0211766 A1 * | 9/2007 | Horikoshi | 370/503 |

FOREIGN PATENT DOCUMENTS

| | | |
|---|---|---|
| GB | 2022954 | 12/1979 |
| GB | 2276794 | 10/1997 |
| WO | WO 00/01091 | 1/2000 |
| WO | WO 00/01092 | 1/2000 |
| WO | WO 02/47301 | 6/2002 |
| WO | WO 02/060081 | 8/2002 |

OTHER PUBLICATIONS

Newton, Harry, "Newton's Telecom Dictionary," ISBN # 1-57820-069-5, Malt Kelsey published, pp. 17.

Takawira, Adaptive Lattice Filters for Narrowband Interference Rejection in Data Set Spread Spectrum Systems, published by IEEE, 1994, pp. 1-5.

Zeidler, et al. "Frequency Tracking Performance of Adaptive Lattice Filters." Conference Record of the Twenty-Fifth Asilomar Conference on Signals, Systems and Computers, 1991, Nov. 4-6, 1991, vol. 2, pp. 643-649.

* cited by examiner

Combining a plurality of signals into a single stream of information by selecting among them on a chip time basis.

520

Forwarding the single stream of information.

SIGNAL SPECTRUM SPREADING AND COMBINING SYSTEM AND METHOD

BACKGROUND OF THE INVENTION

1. Field of the Invention

This invention relates to the field of network communications. In particular, the present invention relates to an efficient system and method for signal spectrum spreading and combining into a single stream.

2. Related Art

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These advantageous results are often realized and maximized through the use of distributed resources (e.g., a personal computer, video device, telephone, etc.) that rely on information communicated over a network in the performance of their prescribed tasks (e.g., internet interface, movie presentation, or communication of a conversation). The information is typically communicated in accordance with predetermined protocols. The ease and efficiency at which the information is converted between communication protocols and processing configurations often has a significant impact on the performance of the end use devices.

There are numerous different communications networks that transfer information in a variety of implementations. Typically a network is defined by its attributes and abilities such as the type of communication medium used (e.g., copper wires, fiber optics, coax cable, radio waves, microwaves, etc.), the cable layout (or topology), data transfer rates, communication protocols, and the method used by nodes to access and use the network (access methods). Usually there are a number of end use devices (e.g., personal computers, telephones, etc.) that are coupled together by communication mediums which convey information to a destination with the assistance of intermediate control devices (e.g., bridges, routers, gateways, switches, repeaters, cellular base stations, satellites, etc.). Wireless communications typically offer a variety of benefits including portability and ease of use. In particular, Code Division Multiple Access (CDMA) digital cellular wireless communication protocols have emerged to typically offer greater signal quality than other wireless communication protocols (e.g., Time Division Multiple Access (TDMA)) resulting in clearer calls.

CDMA utilizes a spread-spectrum approach which typically facilitates deployment in dense urban areas where multipathing is an issue and results in fewer dropped calls. Furthermore, CDMA technology is more power efficient, thereby prolonging the standby and active battery life. One attractive feature of CDMA is that it offers a greater capacity for carrying information over typically limited bandwidth. Airwaves are usually divided into a limited number of different frequency bands by governing organizations (e.g., Federal Communications Commission (FCC) regulations). For example, limited segment of the airwaves are allocated for cellular usage. Due to the huge demand for cellular usage and the limited bandwidth that is available, getting a license from a governing organization to transmit on a particular frequency band is typically expensive. By increasing capacity, CDMA enables Personal Communications Services (PCS) providers to carry more users per channel and usually translates into greater utilization of the limited resources.

Increasingly, wireless digital applications are being used to access digital data (e.g., the Internet, intranet, multimedia, business data, etc.) at high speeds. With high speed wireless access, mobile users can obtain instant access to the Internet, business data (e.g., stock market quotes, sales reports, inventory information, price checks, customer data, emails, pages, etc.), and other real time data (e.g., traffic updates, weather information, sports news, etc.). One desirable goal is to provide cellular handsets, personal digital assistants, portable communications devices, etc. the ability to transmit and receive digital data as well as make conventional telephone calls. This desire has intensified efforts towards ever faster mobile data speeds to meet customer demands. Recent CDMA based 3G standards are proposing increased data rates and capabilities. With greater data is speeds, it is possible to provide even more data to more users.

Figure 1:
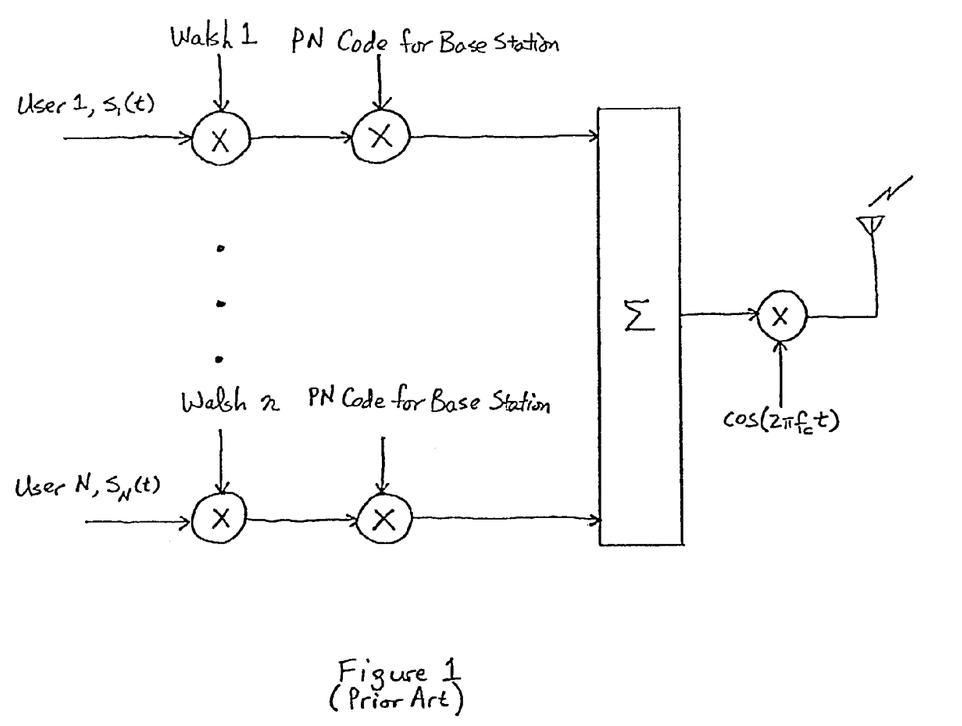
FIG. 1 shows a typical prior art CDMA system.

FIG. 1 shows a typical prior art CDMA system. User signals (e.g., digitized voice signals or digital packetized data) are first modulated by a code which enables multiple users to share the same cell. The most commonly used code is known as a "Walsh" function. As stated above, one advantage of CDMA for personal communication services is its ability to accommodate many users on the same frequency at the same time. This is accomplished by assigning a specific "Walsh" code to each user. Only that particular code can demodulate the transmitted signal for that particular user. Since Walsh codes are orthogonal, users with different codes do not interfere with each other. Next, the signal is modulated by a pseudo-random number. This effectively serves to "spread" the transmitted signal across a wider spectrum. By spreading the signal out across a wider spectrum, the overall power of the transmitted signal can be boosted without exceeding the FCC regulations in any one channel. Finally, user signals of that cell are summed and modulated by a sinusoidal carrier to overcome antenna length requirements to transmit and receive baseband signals.

Communicating the information via different channels provides a variety of advantages in wireless protocols. However, it is often convenient to communicate and/or information in a single stream. Thus, information communicated by CDMA systems is often converted into other protocols (e.g., for further communication and/or processing of the information). In these situations it is often advantageous to have a single stream of information. For example, large quantities of information are sometimes converted from wireless systems to wired communication systems (e.g., FDDI, etc.) for bulk communication (e.g., between cells with significant geographic separation). It is also often necessary to convert information communicated in parallel (e.g., bits of information communicated on 32 separate channels) into a single stream (e.g., a 32 bit word).

It is also often desirable to be in communication with multiple devices simultaneously from the same transmitted data stream. For example, "mesh", "peer-to-peer" or "ad-hoc" networks offer reliability and efficiency advantages over the "hub-and-spoke" network topology typical of most existing wireless cellular communication systems.

SUMMARY OF THE INVENTION

The present invention facilitates efficient and effective signal spectrum spreading and combining into a single stream. The present invention can be utilized to combine multiple spread spectrum signals into a single stream. In one embodiment, the present invention provides both spectrum spreading and combination into a single stream. Both the spread spectrum signal combination system and method and the signal spreading and combining system and method of the present invention facilitate fast communication of information through a communication network. In one embodiment, a plurality of signals are combined into a single stream of information by selecting among them on a chip time basis in a predetermined pattern. It is appreciated the present invention is readily adaptable to also spreading the signals (e.g., signal spectrum spreading) based upon the predetermined pattern.

In one exemplary implementation, the predetermined pattern is pseudo-random (e.g., implemented using a pseudo-random generator). The predetermined pattern can be balanced and have the same number of ones and zeroes. The predetermined pattern can be stored in a precomputed table (e.g., a balanced table with randomly arranged rows). For example, the predetermined pattern is implemented with a shuffled Hadamard function. Alternatively the selection columns of a Hadamard matrix can be implemented using a pseudo-random number generator with the non-selection columns constrained to make the matrix as a whole a shuffled Hadamard.

BRIEF DESCRIPTION OF THE DRAWINGS

The accompanying drawings, which are incorporated in and form a part of this specification, illustrate embodiments of the invention and, together with the description, serve to explain the principles of the invention. It is appreciated that the drawings are exemplary embodiments and the present invention is not limited to the illustrated embodiments, but rather covers alternatives, modifications and equivalents. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a spread spectrum signal combination system and method facilitates efficient and effective combination of multiple spread spectrum signals into a single stream. A present invention signal spectrum spreading and combining system and method can also be utilized to spread signal spectrums. A spread spectrum signal combination system and method of the present invention facilitates flexible and efficient communication of information through a communication network. The present invention can also be utilized to create a single stream spread spectrum signal by performing the spreading and combining together based upon a predetermined pattern (e.g., a shuffled Hadamard). Since the combined signals are coded in parallel, there can be an overall increase in bandwidth and reduction in latency.

Figure 2A:
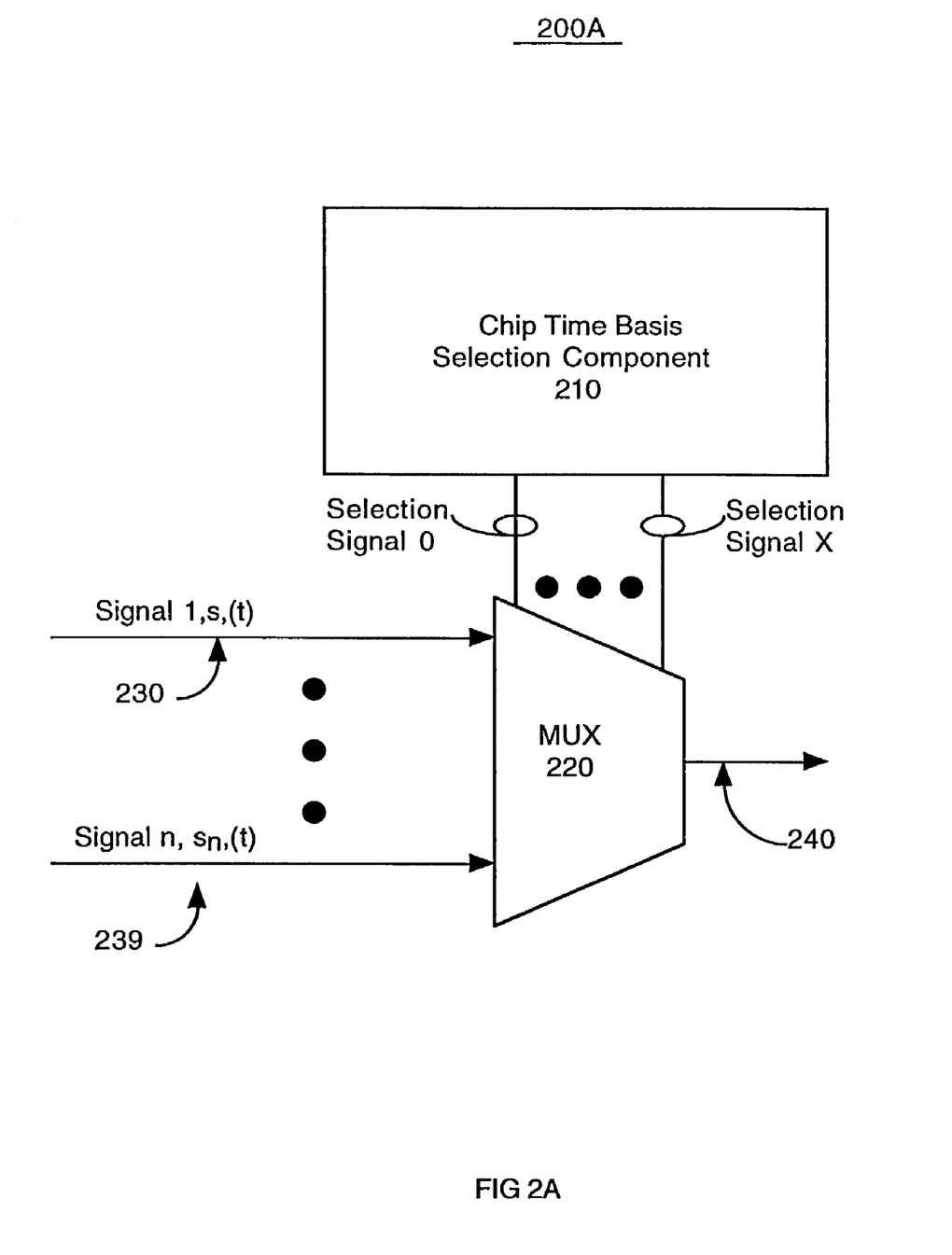
FIG. 2A is an illustration of one embodiment of a spread spectrum signal combination system in accordance with the present invention.

FIG. 2A is an illustration of spread spectrum signal combination system 200A, one embodiment of a spread spectrum signal combination system in accordance with the present invention. Spread spectrum signal combination system 200A comprises a chip time basis line selection component 210, a multiplexer 220, input lines 230 through 239, and output line 240. Chip time basis line selection component 210 is coupled to multiplexer 220 which is coupled to input lines 230 through 239 and output line 240. The components of spread spectrum signal combination system 200 cooperatively operate to aggregate or blend a plurality of input signals (e.g., direct sequence spread spectrum signals) into a single stream output signal by selecting among them on a chip time basis in a predetermined pattern. Multiplexer 220 multiplexes signals on input lines 230. Input lines 230 communicate signals to multiplexer 220. In one exemplary case where the number of signals to be combined is less than the number of input lines, input signals can be assigned to multiple input lines. Output lines 240 communicates signals (e.g. a single stream of information from multiplexer 220). Chip time basis control component 210 controls the multiplexing on a chip time basis. In one exemplary implementation, the chip time basis corresponds to the sampling rate of a signal spreading sequence.

In one embodiment of the present invention, multiplexing selection bits correspond to communication modulation codes of a communication system. By coordinating the selection of the multiplexer input lines to a chip rate, the present invention is able to provide a single stream of information associated with the underlying basic binary symbol information at the multiplexer output without extraneous communication protocol information. For example, the multiplexer can be "synchronized" or coordinated to select an input at a time that it is actually providing selected symbol information and ignore the line when it is conveying other information.

One important set of spread spectrum signal combination selection bit sets is a "shuffled Hadamard Walsh set". By coordinating the selection of the inputs with the pseudo-random selection mechanism of the spread spectrum communication system the present invention is able to combine a plurality of input signals into a single output stream. The present invention provides significant advantages over time division multiplexing done on a symbol basis and/or dithering in which a random selection is made among the lines. For example, in simple, uncorrelated dithering, the chip times when other signals are being transmitted are seen as "noise" to the selected signal, degrading the signal quality, increasing error rate and/or decreasing range. However, the correlation between the input lines and the pseudo-random selection mechanism in accordance with the present invention substantially avoids such "noise" interference. The present invention provides also significant advantages over systems that alternatively sum the input lines together and then quantize the information. For example, summing and quantizing the combined signal also inevitably introduces distortion, which amounts to noise, again degrading signal quality. Again, the present invention minimizes such distortion or "noise" interference. Furthermore, there are significant implementation advantages to transmitting strictly binary (two-leveled) signals.

Figure 4A:
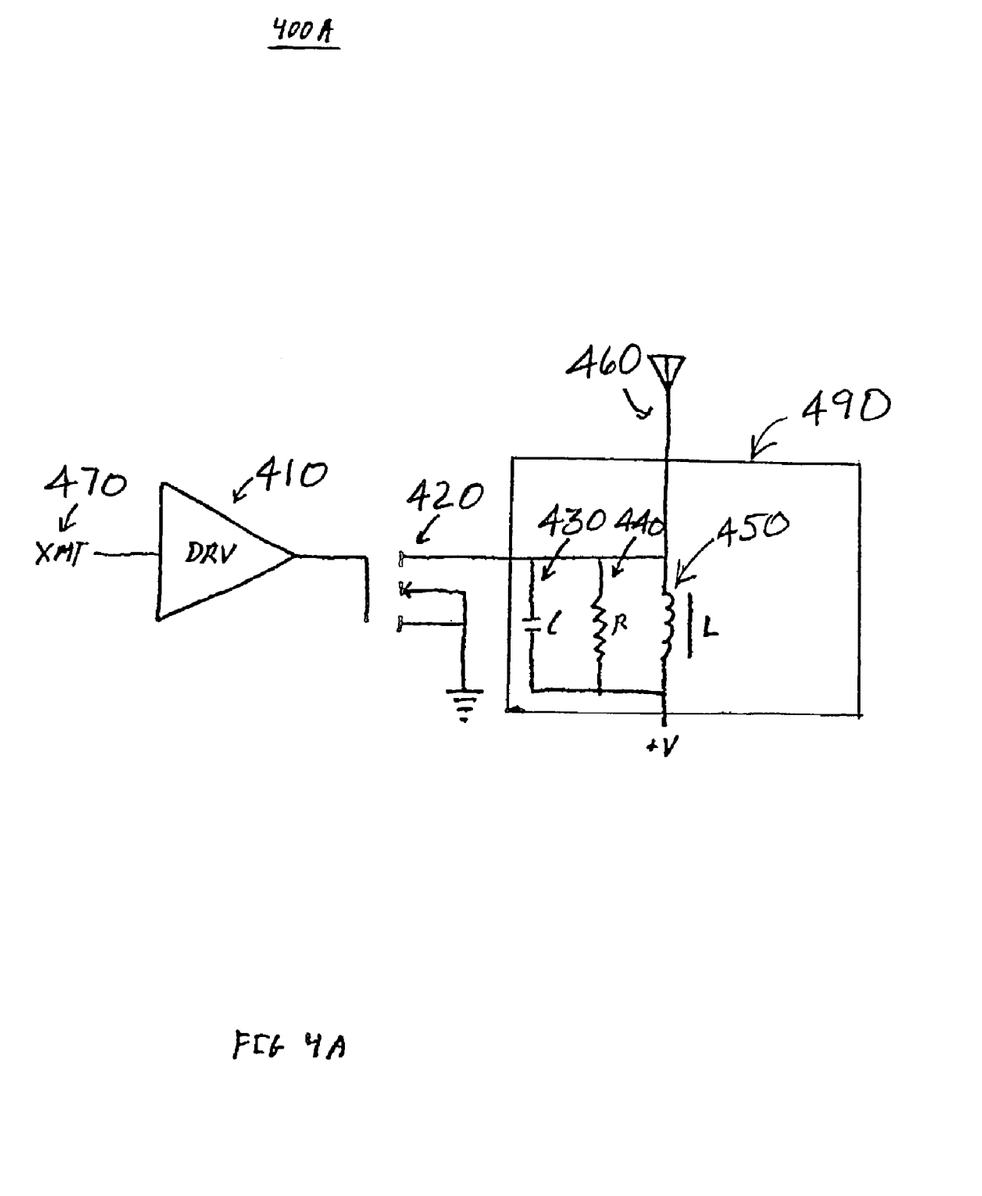
FIG. 4A shows an exemplary implementation of an efficient switch-mode binary transmitter.

FIG. 4A shows an exemplary efficient switch-mode transmitter 400A comprising MOSFET (metal oxide semiconductor field effect transistor) 420, gate driver 410, resonator 490 and antenna 460. Resonator 490 is an RLC circuit in one embodiment and comprises resistor 440, inductor 450 and capacitor 430. MOSFET 420 is fed by gate driver 410 for the binary signal 470. The MOSFET 420 shorts the resistor-inductor-capacitor (RLC) 440, 450, 430 (respectively) of resonator 490 to ground, with the other side of resonator 490 attached to a voltage source (not shown). A transmitted signal is radiated from antenna 460. Switch-mode transmitter 410A and similar circuits can be very efficient, and are quite simple and inexpensive. It would be considerably more difficult, if not impossible, to achieve similar efficiencies for a multi-leveled (e.g., non-binary) signal.

Figure 4B:
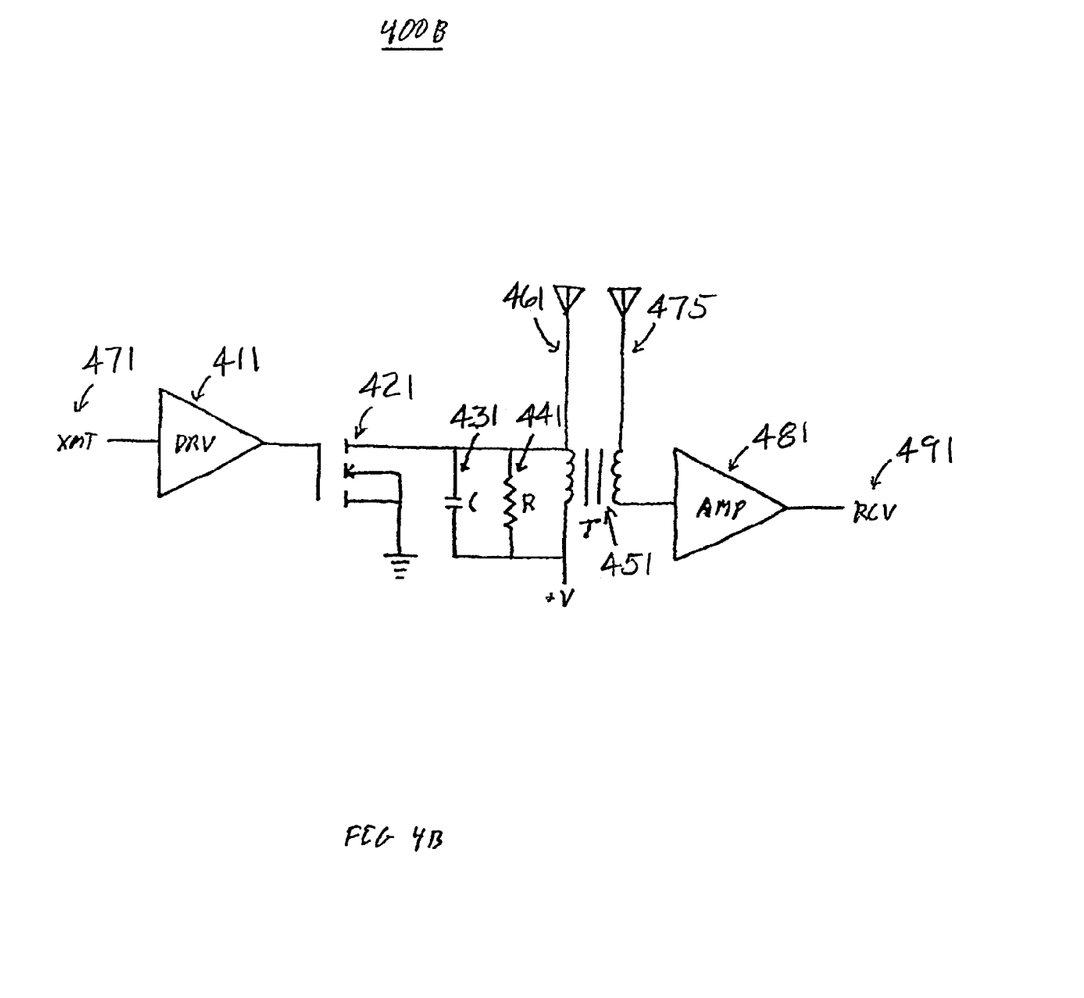
FIG. 4B shows an exemplary implementation of an efficient switch-mode full-duplex transceiver.

A further advantage to binary signal transmission circuits (e.g., switch-mode transmitter 410A) is that it is easily configurable for "full-duplex" operation (where the transmitter and receiver are operating simultaneously). As shown in FIG. 4B, the circuit of FIG. 4A can be modified by replacing the inductor 450 with a "wide-band transformer" 451. FIG. 4B shows an exemplary efficient "full duplex circuit" 400B comprising MOSFET (metal oxide semiconductor field effect transistor) 421, gate driver 411, resistor 441, capacitor 431, wide band transformer 451, antennas 460 and 475 and amplifier 481. The corresponding components of switch-mode transmitter 400A and "full duplex circuit" 400B operate similarly, except one winding of wide band transformer 451 is coupled to in parallel to resistor 441 and capacitor 431 "in place of" inductor 450. The other winding of wide-band transformer 451 couples receive antenna 475 (which can be roughly physically coincident with the transmit antenna 461) with a receive amplifier 481, producing a received signal 491, with the transmitted signal largely cancelled out. Since the signal received by the antenna 475 is a "differential" signal with respect to the signal transmitted by antenna 461, the differentially induced fields from the received signal relative to the transmitted signals cancel. The "inductor" (e.g., wide-band transformer 451) acts as a wire for the differential signal, while still acting as a large-valued (typically several microhenries) inductor for the common mode transmitted signal.

The cancellation may not be perfect in every instance and further processing as described in copending application entitled "A BASEBAND DIRECT SEQUENCE SPREAD SPECTRUM TRANSCEIVER", (application Ser. No. 09/772,210 filed on Nov. 26, 2001, which is incorporated herein by this reference) may be utilized to achieve full-duplex operation. Again, this is significantly simpler for the case of a strictly binary transmitted signal implemented in accordance with the present invention.

Figure 2B:
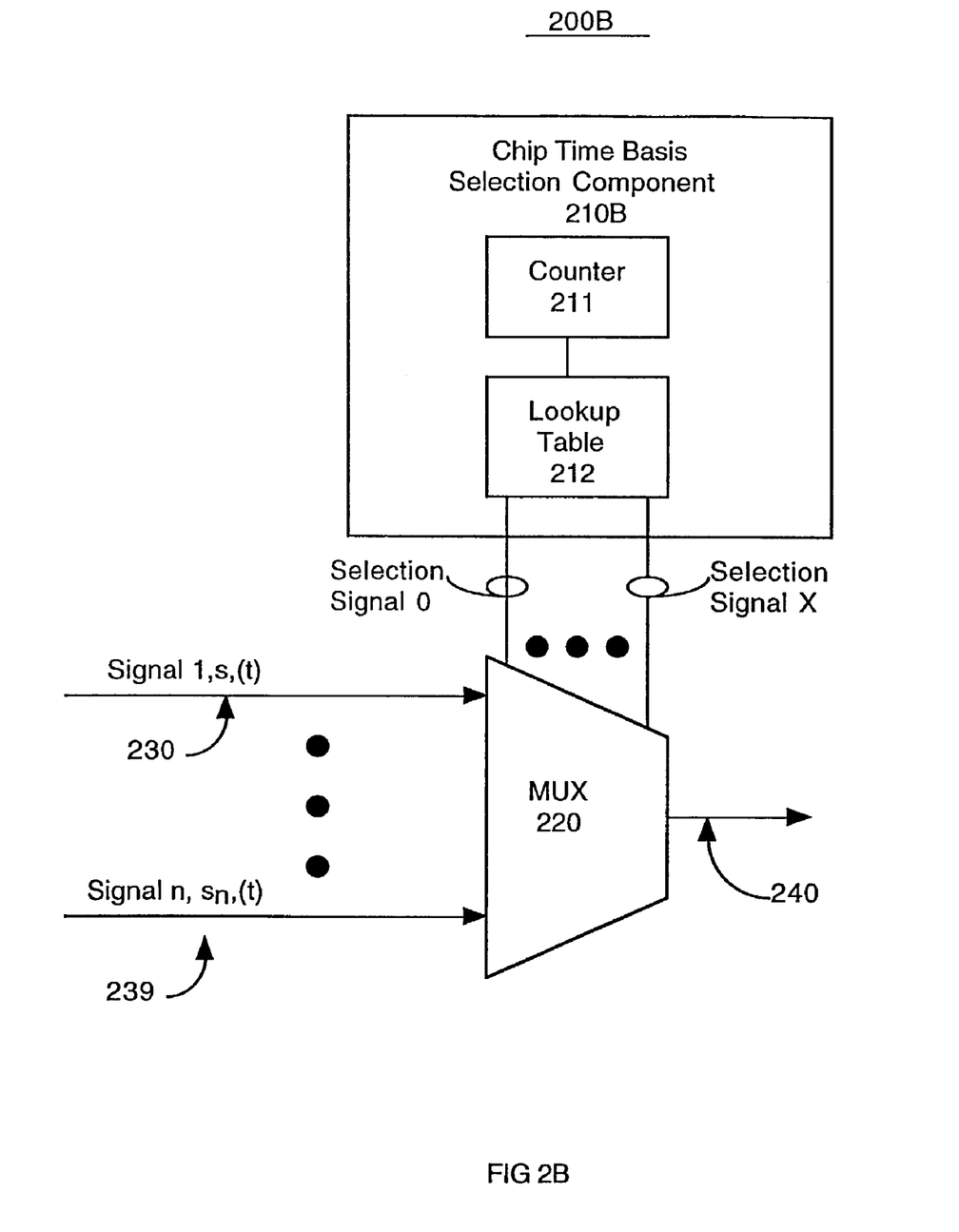
FIG. 2B is an illustration of spread spectrum signal combination system utilizing a lookup table in accordance with one embodiment of the present invention.

FIG. 2B is an illustration of spread spectrum signal combination system 200B, one embodiment of a spread spectrum signal combination system in accordance with the present invention. Spread spectrum signal combination system 200B is similar to spread spectrum signal combination system 200A. In one embodiment of spread spectrum signal combination system 200B, chip time basis line selection component 211 comprises a lookup table 212 and a counter 213. The lookup table can comprise columns of a pre-generated Walsh-Hadamard matrix with pseudo-randomly scrambled rows. The rows of the Walsh-Hadamard table can be randomly "shuffled" by scrambling the order of its rows in accordance with a randomly generated number. In one exemplary implementation, the lookup table is stored in a memory chip (SRAM, DRAM, FLASH, ROM, etc). The memory chip is coupled to the select bits of the multiplexer. Counter 213 is used as a pointer to the row which is to be used in the lookup table. In one embodiment of the present invention, the lookup table and counter are similar to a lookup table and counter described in the co-pending application entitled "APPLICATION OF A PSEUDO-RANDOM SHUFFLED HADAMMARD FUNCTION IN A WIRLELESS CDMA SYSTEM", (application Ser. No. 09/730,697, filed on Dec. 5, 2000) which is incorporated herein by this reference.

Walsh functions are generated using an iterative process of constructing a "Hadamard" matrix. Starting with H1=[0], the Hadamard matrix is built by:

$$H_{2n} = \begin{pmatrix} H_n & H_n \\ H_n & \overline{H_n} \end{pmatrix}$$

For example, the Walsh codes of lengths two and four are shown respectively as:

$$H_2 \begin{pmatrix} 0 & 0 \\ 0 & 1 \end{pmatrix}$$

From the corresponding matrix shown above, the Walsh code words are given by rows. These Walsh/Hadamard matrices can form the basis for orthogonal codes.

In one embodiment of the present invention, the shuffled Walsh/Hadamard function is losslessly compressed. The present invention recognizes one property of a Hadamard matrix is that each column is the XOR of the power of two numbered columns with a corresponding set bit in the selected channel code number. A Hadamard matrix has a quality that permits condensing its rows or columns down to log n the size of the original matrix. It turns out that if just the columns that are numbered powers of two are represented, the others ones can be recovered by XORing them together appropriately. Thereby, a Hadamard matrix can by compressed by storing only the power of two numbered columns. In other words, the $2^N$ by $2^N$ pseudo-randomly shuffled Hadamard matrix can be compressed and stored in an N by $2^N$ matrix. To recover the desired columns of the original matrix the columns are XORed together to the bits set to "1" in the desired column number. The select bits of the multiplex are determined by the codes contained in the lookup table.

In one embodiment of the present invention, a pseudo-random number generator produces a small number of bits (e.g., 3 or 4) in a random sequence. The generated sequence is equally weighted (e.g., the states show up the same number of times in a well randomized way). In one exemplary implementation, a linear feedback shift register with a slight modification is utilized. A normal linear feedback shift register (e.g., an XOR type) that generates a $2^{(n-1)}$ length sequence in addition to extra gates that increase the sequence to a $2^n$. For example, by forcing the state that would otherwise be all zeroes except for 1 (e.g., a run of n−1 zeroes) to go to n zeroes in the next state and then forcing it back to where it would have been if the change had not occurred. The all zero state is inserted at a natural to implement place and treat that as if there are that many rows in the condensed shuffled Hadamard. For example, if three of the columns of the compressed table (or 4 or whatever appropriate number for the particular implementation is) are generated using a pseudo-random number generator (PRNG), then the other columns of the matrix can be precomputed given that PRNG such that the whole matrix is a shuffled Hadamard matrix.

The single stream can be demultiplexed by utilizing a similar shuffled Walsh Hadamard table. A memory chip (SRAM, DRAM, FLASH, ROM, etc) contains the same lookup table as the multiplexing system. The memory chip is coupled to the select bits of the demultiplexer. In other words the table has the identical Walsh/Hadamard matrix with its rows scrambled the same way as that of the multiplexer system. In one embodiment of the present invention, a counter is used as a pointer to the row which is to be used in the lookup table. The counter is synchronized in time to a counter in the multiplexing system. In one exemplary implementation, synchronization is achieved by transmitting a pilot signal to enable the receiver to recover synchronization, or by other methods (e.g., servoing to correlation peaks in the coded data stream).

As stated above, the present invention can include a shuffled arrangement by scrambling the rows of the traditional Walsh Hadamard function. More specifically the rows are shuffled by a random integer sequence. The resulting rows are unique in that the same rows are not used twice. These rows are then stored in the lookup table. In the currently preferred embodiment, the lookup table is 13×8 k size (e.g., thirteen bits by 8 k).

It should be noted that the present invention can be utilized to coordinate single stream multiplexing of a variety of spread spectrum modulation schemes, including wireless or hardwired. In particular the present invention can be applied to multiplexing operations associated with CDMA cellular handsets as well as other CDMA devices or appliances. Moreover, the present invention can be expeditiously applied to peer-to peer wireless applications. Furthermore, although the description set forth herein is directed to a Walsh/Hadamard function, the present invention can be implemented with a variety of orthogonal functions and is not limited to a Walsh/Hadamard function.

In one embodiment of the present invention, multiplexing selection is performed on a "chip" time basis. A "chip rate" is the sampling rate of the spreading code as opposed to "symbol rate" which corresponds to the clock rate of the original signal (e.g., the actual binary information signal). In a typical CDMA Walsh code word example, the period of time needed to transmit a single modulation symbol is called a Walsh symbol interval and is equal to $\frac{1}{4800}$ second (e.g., 208.33 us). The period of time associated with $\frac{1}{64}$ of the modulation symbol is referred to as a Walsh "chip" and is equal to $\frac{1}{307,200}$ (e.g., 3.2550).

Figure 3:
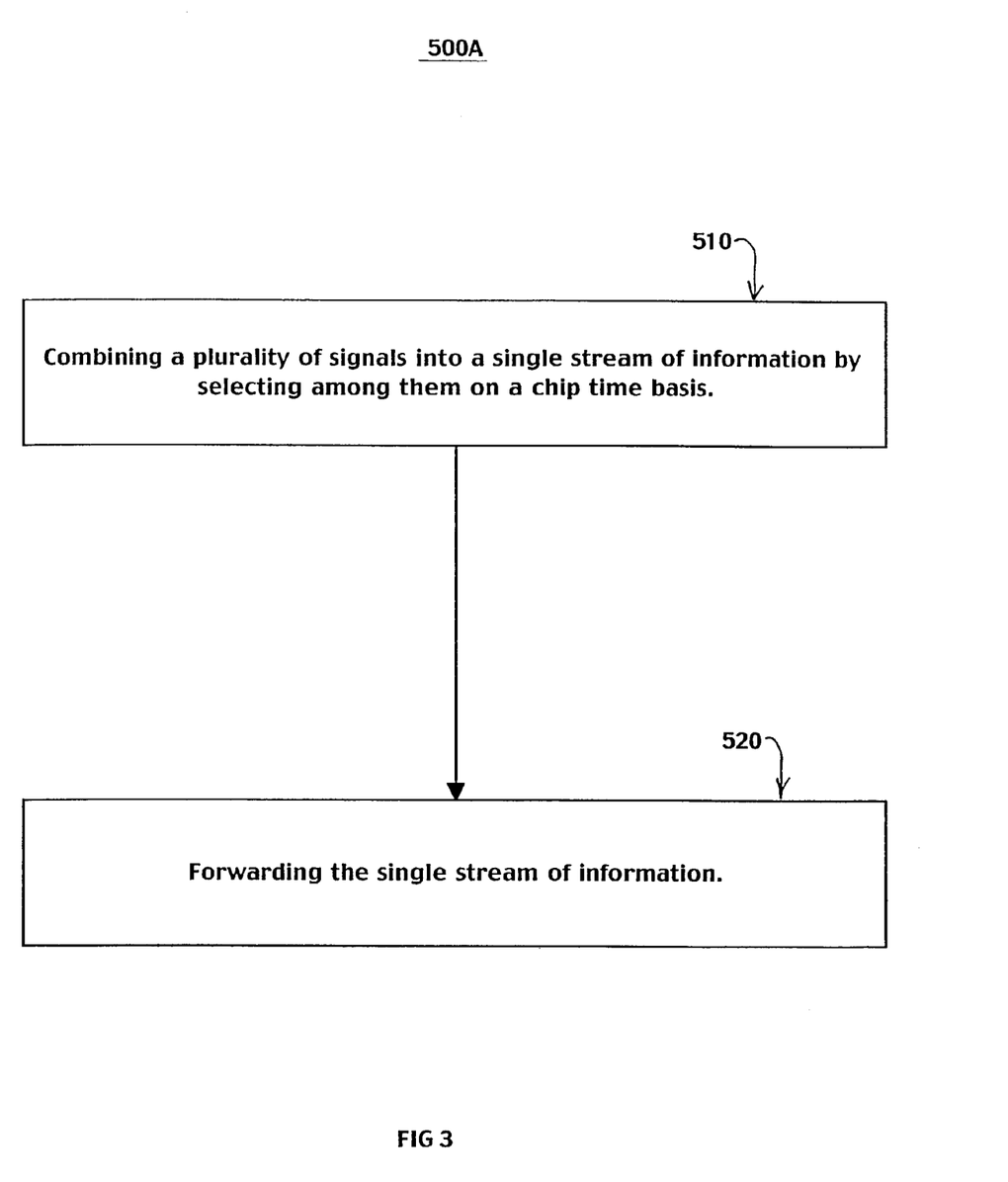
FIG. 3 is a flow chart of spread spectrum signal combination method in accordance with one embodiment of the present invention.

FIG. 3 is a flow chart of spread spectrum signal combination method 500A, a spread spectrum signal combination method in accordance with one embodiment of the present invention.

In step 510 the plurality of signals are combined into a single stream of information by selecting among them on a chip time basis. In one embodiment, the plurality of signals are blended into a single stream by choosing between them in a predetermined pattern. The signals can be spread spectrum signals (e.g., direct sequence spread spectrum signals). The predetermined pattern can be pseudo-random (e.g., implemented using a pseudo-random generator). In one exemplary implementation, the predetermined pattern is balanced and has the same number of ones and zeroes. The predetermined pattern can be stored in a precomputed table (e.g., a balanced table with randomly arranged rows). For example, the predetermined pattern is implemented with a shuffled Hadamard function. Alternatively the selection part of a Hadamard table can be replaced with a pseudo-random number generator such that the rest of the table remains as a shuffled Hadamard.

In one embodiment of the present invention, the plurality of signals are spread and selected (e.g., simultaneously) for combination based upon a predetermined pattern. In an alternate embodiment of the present invention, the plurality of signals is received and combined into a single stream. For example, the signals are received or acquired spread spectrum signals (e.g., from a spread spectrum communication system). In one exemplary implementation, the predetermined pattern is configured to provide constituent parts of that are balanced individually and collectively as a whole.

The single stream of information is forwarded in step 520. In one embodiment of the present invention, the information is forwarded on the output of a multiplexer (e.g., multiplexer 220).

Figure 5:
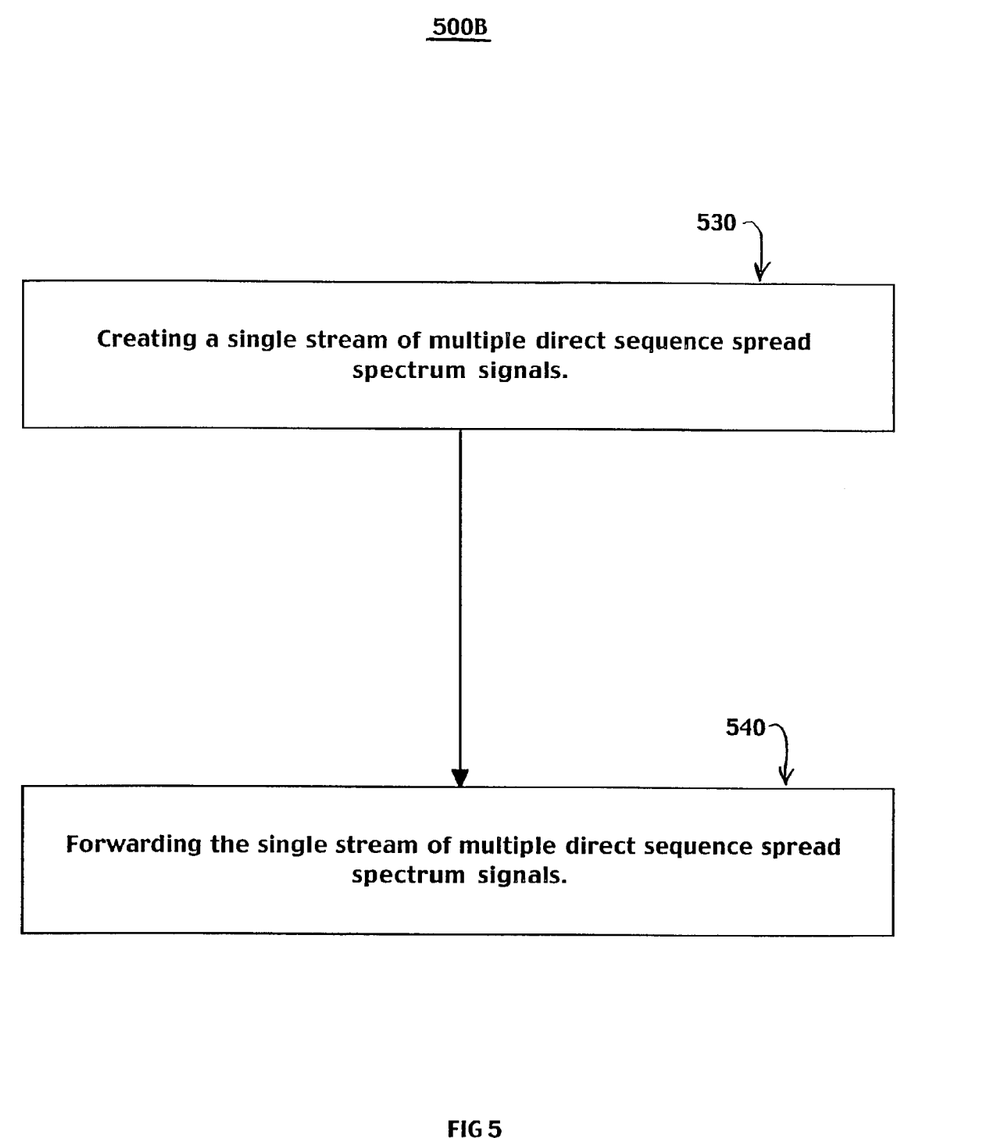
FIG. 5 is a flow chart of a signal spectrum spreading and combining in accordance with one embodiment of the present invention.

FIG. 5 is a flow chart of signal spectrum spreading and combining method 500B, a signal spectrum spreading and combining method in accordance with one embodiment of the present invention. Signal spectrum spreading and combining method 500 can be utilized to create a single stream spread spectrum signal by performing the spreading and combining together based upon a predetermined pattern (e.g., a shuffled Hadamard).

In step 530, a single stream of multiple direct sequence spread spectrum signals are created. In one embodiment, the single stream of multiple direct sequence spread spectrum signals are spread and combined by selecting on a chip time basis in accordance with a predetermined pattern. The predetermined pattern can be a balanced pseudo-random pattern comprising the same number of ones and zeroes. The predetermined pattern can be implemented with a shuffled Hadamard function. The shuffled Hadamard is configured to provide constituents parts of the single stream that are balanced individually and collectively as a whole. In one exemplary implementation the spectrum is white. In one embodiment, the single stream of multiple direct sequence spread spectrum signals is spread and combined by making both the selection rows or columns and the spreading rows or columns a similar shuffled Hadamard matrix.

The single stream of multiple direct sequence spread spectrum signals is forwarded in step 540. In one embodiment of the present invention, the information is forwarded on the output of a multiplexer (e.g., multiplexer 220).

Thus, the present invention system and method facilitates signal spectrum spreading and combining into a single stream. The present invention can also be utilized to facilitate signal combination (e.g., spread spectrum signals) into single stream. Present invention systems and methods take advantage of insight into the coding of signals (e.g., spread spectrum signals) to eliminate multiplexing of extraneous communication coding information. The present invention facilitates communication and processing of information aggregated in multiple channels for greater bandwidth. In addition, the present invention is primarily DC free and the selection of bits is balanced across the input lines (e.g., channels).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims append hereto and their equivalents.

What is claimed is:

1. A signal combination method comprising:
    Combining, with a multiplexer, a plurality of independent, unrelated spread spectrum signals into a single stream of information by selecting among them on a chip time basis in a predetermined pattern, wherein said predetermined pattern is implemented with a shuffled Walsh/Hadamard function with pseudo-randomly scrambled rows; and
    forwarding said single stream of information.

2. A signal combination method of claim 1 wherein the plurality of independent unrelated spread spectrum signals are direct-sequence spread spectrum signals.

3. A signal combination method of claim 1 wherein said predetermined pattern is balanced by having the same number of ones and zeros.

4. A signal combination method of claim 1 wherein said predetermined pattern is pseudo-random.

5. A signal combination method of claim 4 further comprising implementing said pseudo-random pattern using a pseudo-random generator.

6. A signal combination method of claim 4 wherein said pseudo-random pattern is balanced by including the same number of ones and zeros.

7. A signal combination method of claim 1, wherein said predetermined pattern is stored in a pre-computed table.

8. A signal combination method of claim 7 wherein said table is produced using random numbers.

9. A signal combination method of claim 7 wherein said table is balanced.

10. A signal combination method of claim 7 wherein said predetermined pattern is implemented with all or a subset of a shuffled Hadamard matrix.

11. A signal combination system comprising:
    a plurality of input lines configured to communicate multiple independent, unrelated streams of time-varying information;
    a multiplexer coupled to said plurality of input lines, said multiplexer multiplexing said multiple independent, unrelated streams of time-varying information into a single stream of information;
    a chip time basis control component coupled to said multiplexer, said chip time basis control component controlling said multiplexing on a chip time basis, wherein said chip time basis control component further comprises a lookup table; and a counter coupled to said lookup table, said counter pointing to the row which is to be used in said lookup table, and wherein said lookup table comprises a pre-generated matrix corresponding to a Walsh/Hadamard function with pseudo-randomly scrambled rows; and
    a single output line coupled to said multiplexer, said single output line for communicating said single stream of information.

12. A signal combination system of claim 11 wherein said chip time basis control component provides multiplexing selection bits corresponding to communication modulation codes of a communication system.

13. A signal combination system of claim 12 wherein said selection bits correspond to a spread spectrum signal protocol.

14. A signal combination system of claim 12 wherein said selection bits correspond to all or a subset of a shuffled Hadamard matrix.

15. A signal combination system of claim 11 wherein said lookup table comprises rows of orthogonal random bit sequences.

16. A signal combination system of claim 11 wherein said lookup table comprises rows which are randomly shuffled by scrambling the order of said rows in accordance with a randomly generated number.

17. A signal combination system of claim 11 wherein said lookup table is stored in a memory coupled to the select bits of a multiplexer.

18. A signal combination system of claim 11 wherein said lookup table is a shuffled Hadamard matrix.

19. A single combination system of claim 18 wherein the multiplexer is controlled using a subset of the columns of said shuffled Hadamard matrix.

20. A signal combination system of claim 19 wherein all or a subset of columns is generated using a pseudo-random number generator.

21. A signal combination system comprising:
    a means for conveying a plurality of independent, unrelated spread spectrum signals;
    a means for selecting between said plurality of independent, unrelated spread spectrum signals;
    a means for directing said selection on a chip time basis, wherein said chip time basis corresponds to a shuffled Walsh/Hadamard function; and
    a means for forwarding said selected spread spectrum signals.

22. A signal combination system of claim 21 further comprising a means for establishing said chip time basis.

23. A signal combination system of claim 22 wherein said means for establishing said chip time basis comprises a means for looking up a selection sequence.

24. A signal combination system of claim 22 wherein said means for establishing said chip time basis comprises a means for generating a selection sequence.

* * * * *

UNITED STATES PATENT AND TRADEMARK OFFICE
CERTIFICATE OF CORRECTION

| | |
|---|---|
| PATENT NO. | : 7,545,849 B1 |
| APPLICATION NO. | : 10/402878 |
| DATED | : June 9, 2009 |
| INVENTOR(S) | : Michial Allen Gunter |

It is certified that error appears in the above-identified patent and that said Letters Patent is hereby corrected as shown below:

Column 9, line 16, in claim 1, delete "Combining," and insert -- combining, -- therefore.

Column 9, line 25, in claim 2, after "independent" insert -- , --.

Signed and Sealed this

Twenty-second Day of September, 2009

David J. Kappos
*Director of the United States Patent and Trademark Office*